(12) United States Patent
McNeil

(10) Patent No.: US 6,368,025 B1
(45) Date of Patent: *Apr. 9, 2002

(54) MANHOLE LINER INCLUDING FELT IMPREGNATED VINYL

(76) Inventor: Ronald A. McNeil, 5413 Parkview Rd., Graceville, FL (US) 32440

(*) Notice: Subject to any disclaimer, the term of this patent is extended or adjusted under 35 U.S.C. 154(b) by 0 days.

This patent is subject to a terminal disclaimer.

(21) Appl. No.: 09/340,060

(22) Filed: Jun. 28, 1999

Related U.S. Application Data

(63) Continuation of application No. 08/897,965, filed on Jul. 22, 1997, now Pat. No. 5,915,886.

(51) Int. Cl.⁷ .............................................. E02D 29/12
(52) U.S. Cl. ..................... 405/303; 405/52; 405/154; 156/287; 156/294; 428/86
(58) Field of Search ................... 405/303, 52, 154, 405/156, 146, 150.1; 156/287, 294, 71; 428/86; 264/576

(56) References Cited

U.S. PATENT DOCUMENTS

| | | | | |
|---|---|---|---|---|
| 4,009,063 A | * | 2/1977 | Wood | 156/71 |
| 4,135,958 A | * | 1/1979 | Wood | 156/199 |
| 4,776,370 A | * | 10/1988 | Long | 138/98 |
| 4,861,634 A | * | 8/1989 | Naud | 428/36.1 |
| 5,106,440 A | * | 4/1992 | Tangeman | 156/94 |
| 5,265,981 A | * | 11/1993 | McNeil | 405/303 |
| 5,280,811 A | * | 1/1994 | Catallo et al. | 138/98 |
| 5,382,461 A | * | 1/1995 | Wu | 428/86 |
| 5,490,744 A | * | 2/1996 | McNeil | 405/303 |
| 5,633,063 A | * | 5/1997 | Lause et al. | 428/86 X |
| 5,915,886 A | * | 6/1999 | McNeil | 405/52 X |

\* cited by examiner

*Primary Examiner*—David Bagnell
*Assistant Examiner*—Frederick L. Lagman
(74) *Attorney, Agent, or Firm*—Liniak, Berenato, Longacre & White, LLC

(57) ABSTRACT

A liner assembly for a manhole or passage comprises a multiple-ply, generally cylindrical tube. The outermost ply includes inner and outer surfaces and is adapted for being impregnated with material for rigidifying and bonding the outer surface of the outermost ply to a manhole or passage. The innermost ply includes inner and outer surfaces and is adapted for being impregnated with a material for rigidifying the innermost ply. An impermeable ply is disposed between the innermost and outermost plies. The impermeable ply includes an impermeable membrane having fibers impregnated on the inner and outer surfaces of the impermeable ply. The fibers of the inner surface of the impermeable ply bond with the epoxy impregnated outer surface of the innermost ply. Likewise, the fibers of the outer surface of the impermeable ply bond with the epoxy impregnated inner surface of the outermost ply, so that the manhole or passage becomes structurally reinforced.

20 Claims, 3 Drawing Sheets

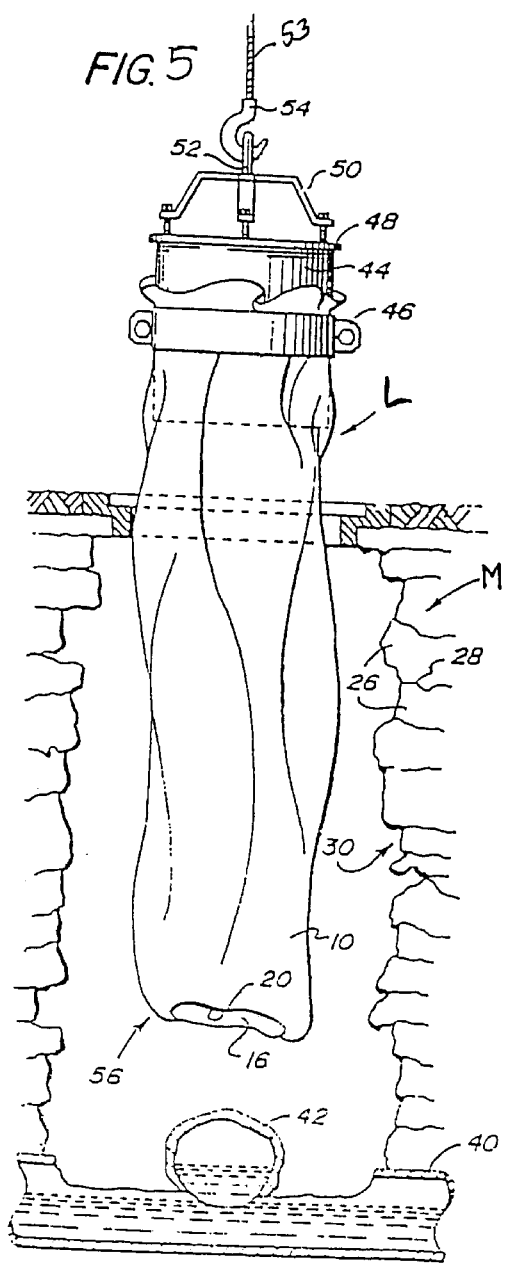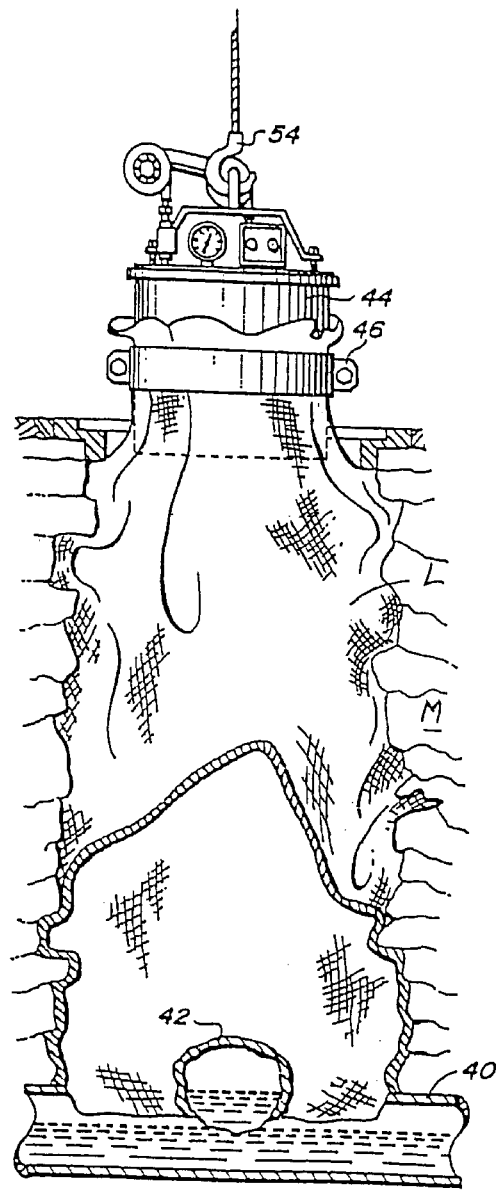

MANHOLE LINER INCLUDING FELT IMPREGNATED VINYL

This is a continuation of Ser. No. 08/897,965 filed on Jul. 22, 1997, now U.S. Pat. No. 5,915,886.

FIELD OF THE INVENTION

The present invention relates to an improved liner for rehabilitating pipes, passages, and manholes. In particular, the present invention relates to a multiply internal lining for an eroded or damaged pipe, manhole, or passageway, in which a felt impregnated vinyl ply is mechanically locked to inner and outer resin hardened fiberglass plies.

BACKGROUND OF THE INVENTION

Waste water is transported through a system of conduits, known as sewers, from the point of generation to a remote treatment or disposal site. Frequently, the exposed surfaces become deteriorated, resulting in undesirable leakage and difficulty with the flow of the fluid. The sewers are typically provided with a vertically disposed manhole. The manhole has an opening at the surface or grade level. The lower or invert end of the manhole has a flow path, known as a lateral, through which sewage flows on its way to the treatment plant. The manhole may be formed of cement, concrete or brick, and typically has an internal diameter many times greater than the diameter of the flow path of the lateral.

The sewage may generate an atmosphere which is damaging to the mortar with which a brick manhole is formed. Alternatively, the environment may be damaging to the cementitous material used in manufacturing the manhole. Should the manhole be damaged, then rainfall or surface water may enter the manhole, thereby overloading the sewage system and potentially causing untreated sewage to be discharged into streams, lakes, and the like. Preserving the structural integrity of manholes is one means of minimizing the load applied to a sewage pumping treatment plant. These problems also apply to sewage stations, which are located along the sewage collection system, and which may also require rehabilitation.

In the past, systems have been developed to rehabilitate or repair damaged manholes. For instance, my prior U.S. Pat. No. 5,265,981, the disclosure of which is incorporated herein by reference, discloses a system and method for rehabilitating a manhole. In that system, inner and outer fiberglass plies sandwich a middle impermeable ply. The outer ply is adapted for being impregnated with a material which rigidities the outer ply to the manhole. The middle ply is impermeable and prevents fluid from seeping into the manhole. The inner layer is also impregnated with a material which rigidifies the inner layer, so that the manhole becomes structurally reinforced. My prior U.S. Pat. No. 5,490,744, the disclosure of which is incorporated herein by reference, discloses a method and apparatus for inflating and curing a resin impregnated manhole liner.

My above described patents constituted a significant and advantageous improvement in the art. However, further improvement is virtually always possible in any field of endeavor, which turned out to be true here. For example, because the middle ply is made from an impermeable material, it is slick and may not always bond well to the epoxy impregnated inner and outer plies. Thus, while the manhole is structurally reinforced, there still remains a risk of the inner reinforced layer prying loose.

Thus, there is a need in the art for a liner for sealing and reinforcing a manhole, in which an impermeable middle layer is structurally bonded with the inner and outer plies, providing extra structural reinforcement.

SUMMARY OF THE INVENTION

A principal object of the present invention is to provide a liner for sealing and reinforcing a manhole which provides extra structural reinforcement to the manhole.

The above object is achieved according to the present invention.

A liner assembly for sealing and reinforcing a manhole is provided. The assembly includes a multiple ply contoured tube having first, second, and third oriented plies. The first ply includes inner and outer surfaces for being impregnated with a material for rigidifying and binding the outer surface of the first ply to the interior of the manhole. The third ply includes inner and outer surfaces for being impregnated with a material for rigidifying the inner surface of the third ply, so that the interior of the manhole is structurally reinforced. The second ply is impermeable to fluids, and is disposed between the first and third outermost plies. The second ply includes an impermeable membrane having fibers impregnated on inner and outer surfaces of the second ply, but not penetrating the membrane. The outer surface of the second ply is bonded to the inner surface of the first ply, and the inner surface of the second ply is bonded to the outer surface for the third ply. The liner assembly includes means for securing the outermost, innermost, and impermeable plies together, so that the plies are facially oriented.

A rehabilitated manhole is provided. The manhole includes a vertically disposed manhole having an upper end, internal walls, and a lower end with at least one lateral. A reinforcing system is positioned within the manhole. The reinforcing system includes a support tube assembly comprising first, second, and third juxtaposed layers, with the first and third layers formed from a woven, structural material. The second layer is disposed between the first and third layers, and is formed from a membrane impermeable to fluids and has fibers impregnated on its first and second surfaces, but not penetrating through the membrane. Each of the first and third layers is impregnated with an epoxy resin system, so that the first and third layers are rigidified and the third layer is bonded to the internal walls and lower end of the manhole. In addition, the fibers on the first surface of the second layer are bonded to the inner surface of the third layer, and the fibers on the second surface of the second layer are bonded to the outer surface of the first layer. Each of the layers is cut proximate to the lateral for permitting access thereto.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 5 is an elevational view, partially in section, illustrating the liner assembly of FIG. 1 being positioned within a manhole; and FIG. 6 is an elevational view, partially in section, of the manhole of FIG. 5 after the liner assembly has been inflated.

DETAILED DESCRIPTION OF THE INVENTION

Figure 1:
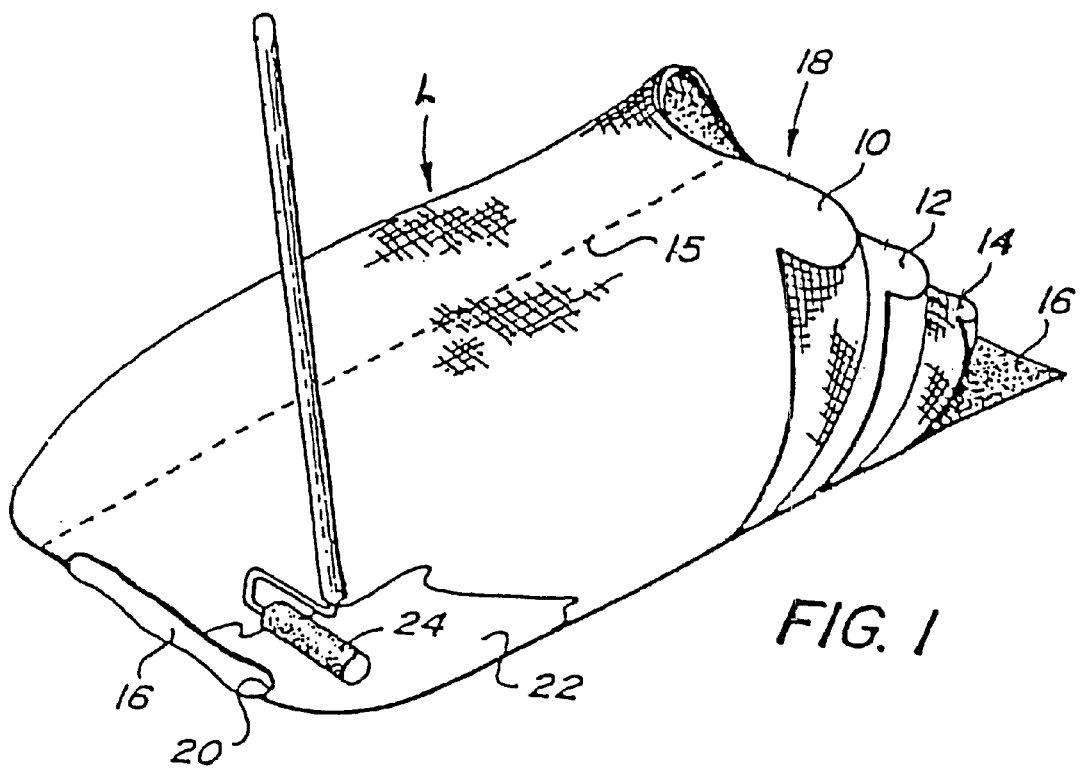
FIG. 1 is a schematic view of the liner assembly of the invention.

Liner assembly L, as best shown in FIG. 1, is a generally cylindrical tube comprised of plies or layers 10, 12, and 14. An inflation bladder 16 overlies the ply 14, but is selectively removable therefrom. The liner assembly L has an open end 18 and an opposite closed end which has a contoured cut 20 therein.

The liner assembly L is formed from a plurality of plies 10, 12, and 14 which are facially disposed in the order named. Respective edges of the plies are secured together, such as by stitching 15 with a double needle machine, in order to create the generally tubular configuration of the liner assembly L. The stitching also serves to maintain the plies 10, 12, and 14 in their facially disposed orientation during fabrication of the liner assembly L and its subsequent installation. While the liner assembly L is disclosed as being cylindrical, it may have whatever shape is called for by the structure to be rehabilitated.

The plies 10 and 14 are both formed from a woven structural-type fiberglass, such as disclosed in my prior cited U.S. Pat. No. 5,265,981. I prefer that the fiberglass be a 24 oz. woven roving, in order to provide adequate structural integrity for the use to which the liner assembly L is to be put.

Figure 2:
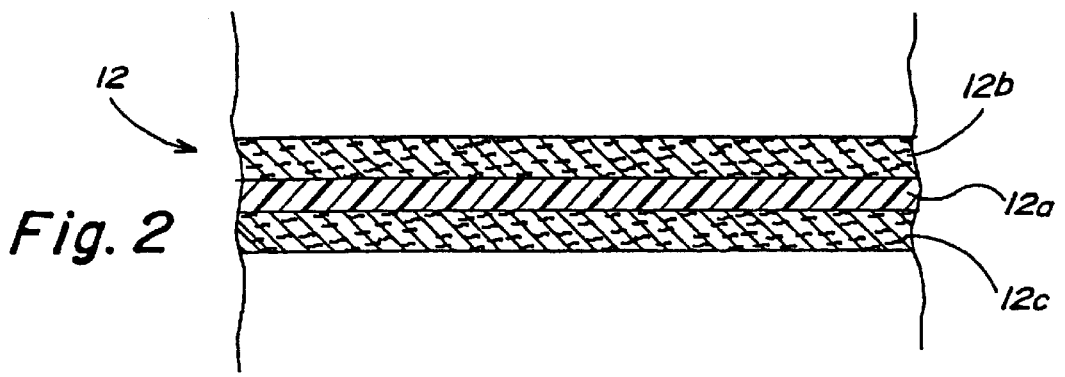
FIG. 2 is a cross-sectional view of the preferred embodiment of the second ply of the present invention.

The ply 12, on the other hand, is a composite fabric, and is best illustrated with reference to FIGS. 2, 3, and 4. With reference in particular to FIG. 2, ply 12 includes a nonporous inner membrane 12a sandwiched between outer layers of fiber 12b and 12c. The inner membrane is impermeable to water, gas, and chemical attack, which provides strength to the liner assembly L during manufacture and installation, and also prevents migration of water, gas, and chemicals from the ply 10 to the ply 14. In the preferred embodiment, the inner membrane 12a is a polyester fabric, coated with polyvinyl chloride, so that the polyester fabric is encased in a vinyl blanket forming the membrane. The outer fiber layers 12b and 12c are polyester felts, which is impregnated or impressed onto the outer surfaces of the inner membrane 12a to be mechanically connected thereto. The felt fibers of layers 12b and 12c do not penetrate inner membrane 12a, so ply 12 retains its impermeable quality. A suitable composite material for the ply 12 may be purchased from the Hartz Corporation. The ply 12 has a thickness of 2.77 mm, greater than that of plies 10 and 14. The base polyester fabric 12a has a weight of 4.0 oz/yd$^2$.

Each of the plies 10 and 14 is impregnated with an epoxy resin system prior to installation of the liner assembly L. The epoxy resin system causes the fiberglass layers 10 and 14 to be rigidified after being cured, while being mechanically bonded also to the ply 12. The resin impregnated plies 10 and 14 mesh with the outer fiber layers 12b and 12c of ply 12, causing the epoxy resin to be absorbed onto the outer fiber layers 12b and 12c. When the resin is cured, the fibers of layers 12b and 12c of ply 12 become mechanically bonded with the resin impregnated plies 10 and 14, forming a strong bond between the plies.

Figure 3:
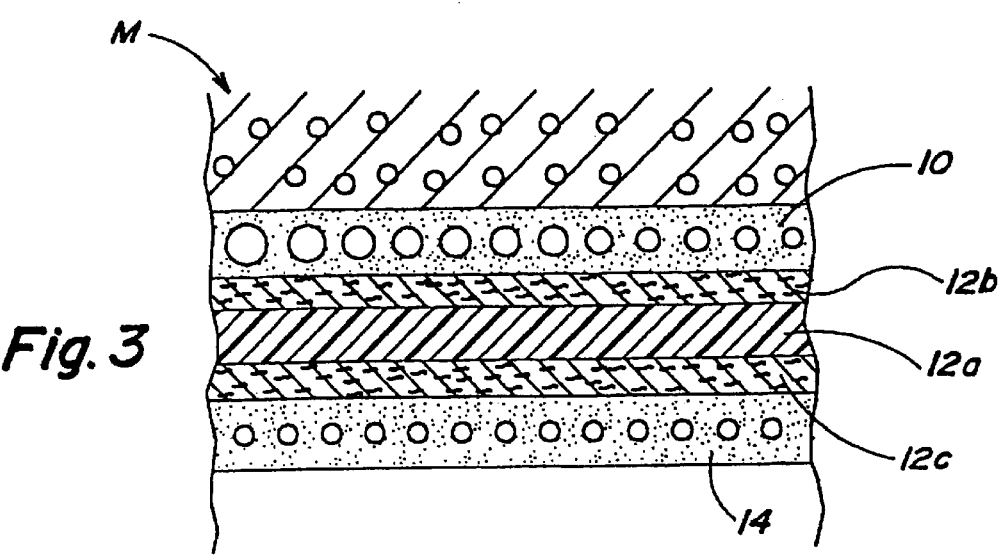
FIG. 3 is a cross-sectional view of the preferred embodiment of the second ply as it is used according to the present invention.

With reference to FIG. 3, outer fiber layers 12b and 12c of ply 12 provide a mechanical connection to the plies 10 and 14 after the resin hardens, bonding an outer fiber layer 12b of ply 12 to outer ply 10, and the outer fiber layer 12c to the inner ply 14, securely together. Thus, because inner ply 14 and ply 12 are mechanically connected, the risks of prying ply 14 from ply 12, and rupturing ply 12, are significantly reduced. To increase the strength of the bond between the plies, the thickness of the felt of layers 12b, 12c can be increased or varied. The thicker the felt, the stronger the bond will be between the plies. In addition, the epoxy resin system causes the ply 10 to be bonded to the surrounding walls of the manhole, thereby providing structural support for the manhole because the epoxy resin system fills the openings left by damaged or removed mortar, or the like.

The epoxy resin system 22 may be applied to the liner assembly L through a roller 24 5 which spreads the resin system 22 over the plies 10 and 14. Each of the plies 10 and 14 should be thoroughly impregnated by resin 22. In practice, the outer two layers of the liner assembly L are peeled back, much like socking and unsocking two tube socks, and the resin is initially applied to the ply 14, after which the bladder 16 is then applied. The liner assembly L is then realigned with the interior fiberglass layer and the inflation bladder, and the epoxy resin system 22 then applied to the ply 10. I prefer that the plies 10 and 14 be impregnated with a two component epoxy system, such as disclosed in my prior cited U.S. Pat. No. 5,265,981 and U.S. Pat. No. 5,490,744.

Figure 4:
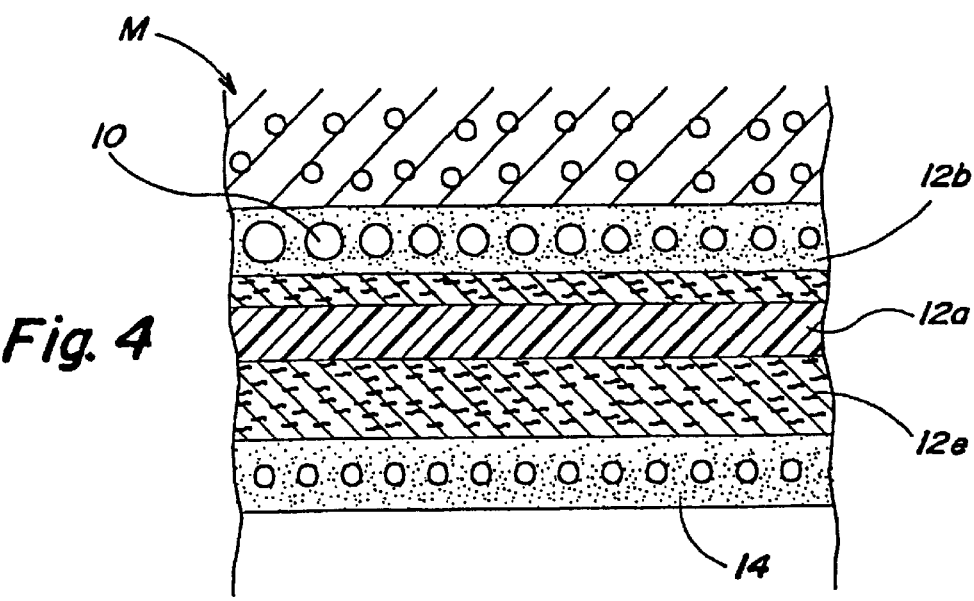
FIG. 4 is a cross-sectional view of an alternative embodiment of the second ply as it is used according to the present invention.

In an alternative embodiment, the outer fiber layers 12d and 12e are of differing thicknesses, as illustrated with particular reference to FIG. 4. In FIG. 4, the outer fiber layer 12e of ply 12 is thicker than the outer fiber layer 12d of ply 12. The thicker layer 12e provides a stronger bond between ply 12 and inner ply 14, than the bond formed between layer 12d and ply 10. While it is important to have a strong bond between both ply 12 and ply 10 and ply 12 and ply 14, a stronger bond may be desired between ply 12 and ply 14, because ply 14 is directly exposed to the damaging environment of the sewage system. However, it should be understood that outer layers 12d and 12e may be of any thickness, as is desired.

Once the liner assembly L has been manufactured, its layers are impregnated with the epoxy resin, and it is lowered into the manhole M. Manhole M, as best shown in FIG. 5, is a brick manhole which has bricks 26 secured together by mortar 28. The faces 30 of the bricks 26 have become irregular due to the damaging environment to which the faces 30 have been exposed. Likewise, the mortar 28 also has been damaged or removed by the environment, with the result that the bricks 26 are spalling and/or being loosened and removed.

Liner assembly L is adapted and designed to reinforce the manhole M while permitting the sewer pipes 40 and 42 to remain in service. It can be seen in FIG. 5 that a crane (not shown) has a cable 53 to which a hook 54 is attached for connection to bracket 52 of lifting assembly 50 secured to flange 48 by bolts. Collar 46 may be used to secure the liner assembly L to the neck 42.

Use of the liner L of FIG. 1 for rehabilitation of the manhole M of FIG. 5 proceeds relatively quickly, requiring only a few hours for preparation of the liner assembly L.

Prior to beginning rehabilitation of the manhole M, I have found it desirable to take measurements or to review accurate blueprints so that the liner assembly L may be fabricated to substantially correspond to the contour of the manhole M.

Although I have illustrated the manhole M and its corresponding liner assembly L as being generally cylindrical in configuration, those skilled in the art will appreciate that the manhole M may have any shape. The liner assembly L is manufactured to substantially correspond to the configuration and at least the size of the manhole M, thereby substantially eliminating any gapping which could occur between the liner assembly L and the surfaces of the manhole M. I have found that the liner assembly L can be appropriately fabricated by conventional sewing techniques, and the stitching 15 resulting from those techniques achieves the added benefit of securing the plies 10, 12, and 14 together. Each of the plies 10, 12, and 14 is normally rectangular in plan, so that the liner assembly L requires that respective edges of the plies be secured together, preferably by double needle stitching, in order to create the tubular configuration of FIG. 1, or whatever other configuration may be required to match the contour of the manhole M. Additional stitching may also be provided as necessary.

After the liner L has been appropriately positioned within the manhole M, then the assembly L is pressurized with heated air, as disclosed in my prior cited references U.S. Pat. Nos. 5,265,981 and 5,490,744. This causes the liner assembly L to inflate and contact the walls of the manhole M to cure the resin system impregnating the plies 10 and 14.

FIG. 6 illustrates the liner assembly L when positioned within the manhole M and after having been inflated with pressurized heated air. It can be seen in FIG. 6 that the liner assembly L and the resin system impregnating the ply 10 intimately engage the exposed faces 30 of the bricks 26, and also permit the laterals 40 and 42 to be preserved. The intimate engagement of the ply 10 and its impregnated resin with the bricks 26 and mortar 28 of the manhole M not only stops water infiltration and gaseous and chemical deterioration in the manhole M, but also provides structural support thereafter. The resin 22 impregnating the ply 10 causes the ply 10 to be rigidified. The ply 10 is formed from a structural-type of fiberglass, so that it provides substantial support to the manhole M thereafter. The ply 14 is likewise formed from a structural fiberglass, and the resin system 22 impregnating the ply 14 likewise causes the ply 14 to become rigidified. The rigidified plies 10 and 14 thereby provide structural support to the manhole, substantially increasing its usable life.

Moreover, the mechanical attachment of outer fibers 12b, 12c to plies 10 and 14 provide further structural support and integrity to the rehabilitated manhole M. Ply 14, when rigidified to fibers 12b of ply 12, protects the inner membrane 12a of outer ply 12, such as when the manhole M may be accessed for inspection, line cleaning, or televising of sewer lines within the system. It is not unusual to access manholes with ladders, harnesses and other devices and to use different types of equipment within the manhole structure. Such equipment could, however, tear the non-porous ply 12, so as to permit water infiltration. Therefore, the bonding of the two structural layers of resin impregnated fiberglass to the outer fibers 12b, 12c is important for providing extra structural support for the non-porous inner membrane 12a.

After curing of the resin system, the non-porous membrane 12a provides a permanent barrier to stop further deterioration of the manhole from gases or chemicals and eliminates any infiltration or exfiltration. The bladder 16, when removed, uncovers the cut portion 20 which surrounds the laterals 40 and 42 so as to permit access to the them. While this invention has been primarily described for rehabilitating manholes, it may also be used in large diameter pipes and passages.

While this invention has been described as having a preferred design, it is understood it is capable of further modifications, uses and/or adaptations of the invention following the general principle of the invention and including such departures from the present disclosure which come within known or customary practice in the art to which the invention pertains, and as may be applied to the central features hereinbefore set forth, and falls in the scope of the invention and the limits of the appended claims.

What I claim is:

1. A liner assembly for sealing and reinforcing the walls of a manhole, comprising:

a) a multiple ply contoured tube comprising first and second oriented plies, said first ply includes inner and outer surfaces for being impregnated with a material for rigidifying and binding said outer surface of first ply to the interior of a manhole;

b) said second ply is impermeable to fluids and disposed adjacent said first ply, said second ply includes an impermeable membrane having fibers impregnated on inner and outer surfaces of said second ply but not penetrating said membrane, said outer surface of said second ply is adapted for being bonded with said inner surface of said first ply; and c) means securing said first and second plies together so that said plies are facially oriented.

2. The assembly of claim 1, wherein;

a) said fibers of said second ply are impressed on said inner and outer surfaces of said second ply.

3. The assembly of claim 2, wherein;

a) said fibers of said second ply are a felt.

4. The assembly of claim 3, wherein;

a) said fibers of said second ply are a polyester felt.

5. The assembly of claim 4, wherein;

a) said membrane of said second ply is a fabric having a coating applied thereto.

6. The assembly of claim 5, wherein;

a) said membrane of said second ply is a polyvinyl coated polyester fabric.

7. The assembly of claim 6, wherein;

a) said second ply is impermeable to liquids.

8. The assembly of claim 7, wherein;

a) said first ply is a woven fiberglass fabric; and b) said first and second plies are secured together by stitching.

9. The assembly of claim 8, wherein;

a) said fiber s disposed on said inner and outer surfaces of said second ply are of the same thickness.

10. The assembly of claim 8, wherein;

a) said fibers disposed on said inner and outer surfaces of said second ply are of different thicknesses.

11. A rehabilitated manhole, comprising:

a) vertically disposed manhole having an upper end, an internal wall, and a lower end with at least one lateral;

b) a reinforcing system positioned within said manhole, said reinforcing system including a liner assembly comprising first and second juxtaposed plies with said first ply formed from a woven structural material and said second ply being disposed adjacent said first ply and formed from a membrane impermeable to fluid and having fibers impregnated on first and second surfaces of said second ply but not penetrating through said membrane;

c) said first ply is impregnated with an epoxy resin system so that said first is rigidified and said fibers on said second surface of said second ply are bonded to an outer surface of said first ply; and d) each of said plies is cut proximate said lateral for permitting access thereto.

12. The manhole of claim 11, wherein;

a) said fibers of said second ply are impressed on said inner and outer surface of said second ply.

13. The manhole of claim 12, wherein;

a) said fibers of said second ply are a felt.

14. The manhole of claim 13, wherein;

a) said fibers of said second ply are a polyester felt.

15. The manhole of claim 14, wherein;

a) said membrane of said second ply is a fabric having a coating applied thereto.

16. The manhole of claim 15, wherein;

a) said membrane of said second ply is a polyvinyl coated polyester fabric.

17. The manhole of claim 16, wherein;

a) said second ply is impermeable to liquids.

18. The manhole of claim 17, wherein; a) said first ply is a woven fiberglass fabric; and b) said first and second plies are secured together by stitching.

19. The manhole of claim 18, wherein;

a) said fibers disposed on said inner and outer surfaces of said second ply are of the same thickness.

20. The manhole of claim 18, wherein;

a) said fibers disposed on said inner and outer surfaces of said second ply are of a different thickness.

* * * * *